(12) United States Patent
Qi et al.

(10) Patent No.: US 11,634,144 B2
(45) Date of Patent: Apr. 25, 2023

(54) SENSING METHOD AND SENSING DEVICE FOR HUMAN DRIVEN VEHICLES UNDER PARTIAL VANET (VEHICULAR AD HOC NETWORK) ENVIRONMENT

(71) Applicant: ZHEJIANG UNIVERSITY, Zhejiang (CN)

(72) Inventors: Hongsheng Qi, Zhejiang (CN); Rumeng Dai, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 256 days.

(21) Appl. No.: 17/020,811

(22) Filed: Sep. 24, 2020

(65) Prior Publication Data
US 2021/0101602 A1 Apr. 8, 2021

(51) Int. Cl.
| | | |
|---|---|---|
| *G06N 3/04* | (2006.01) | |
| *H04W 84/18* | (2009.01) | |
| *H04W 4/46* | (2018.01) | |
| *B60W 40/04* | (2006.01) | |
| *G06N 3/049* | (2023.01) | |

(52) U.S. Cl.
CPC ............. *B60W 40/04* (2013.01); *G06N 3/049* (2013.01); *G06N 3/0481* (2013.01); *H04W 4/46* (2018.02); *H04W 84/18* (2013.01); *B60W 2554/4041* (2020.02); *B60W 2554/80* (2020.02)

(58) Field of Classification Search
CPC ......... B60W 40/04; B60W 2554/4041; B60W 2554/80; G06N 3/0481; G06N 3/049; H04W 4/46; H04W 84/18
See application file for complete search history.

(56) References Cited

U.S. PATENT DOCUMENTS

| | | | | |
|---|---|---|---|---|
| 11,391,579 | B2 * | 7/2022 | Forsberg | ................ G06V 20/58 |
| 11,414,073 | B2 * | 8/2022 | Visintainer | ............ B60W 30/16 |
| 2019/0304309 | A1 * | 10/2019 | Sakamoto | ............. B60W 10/20 |
| 2020/0250499 | A1 * | 8/2020 | Kim | ..................... G06K 9/6289 |

* cited by examiner

*Primary Examiner* — Peter D Nolan
*Assistant Examiner* — Anwar Mohamed

(57) ABSTRACT

A sensing method and a sensing device for HDVs (human driven vehicles) under a partial VANET environment are provided. According to the method, an existence sensing module and a location sensing module are constructed, based on a long-short-term-memory recurrent neural network, with utilizing historical information of motion states of a single CAV (connected and autonomous vehicle) as an input, existence and exact locations of surrounding HDVs of the CAV are outputted. The method is not only applicable to sensing the surrounding HDVs of the single CAV, but also the surrounding HDVs of the multiple CAVs. An estimation result of each CAV is firstly obtained, then the estimation results of the CAVs are checked with confliction criterion, according to checking results, the estimation results of the multiple CAVs are fused, and information about the surrounding HDVs of each CAV is finally outputted.

4 Claims, 8 Drawing Sheets

Application scenario
FIG. 1(a)

Typical devices required by CAV
FIG. 1(b)

SENSING METHOD AND SENSING DEVICE FOR HUMAN DRIVEN VEHICLES UNDER PARTIAL VANET (VEHICULAR AD HOC NETWORK) ENVIRONMENT

BACKGROUND OF THE PRESENT INVENTION

Field of Invention

The present invention relates to a technical Field of VANET (vehicular ad hoc network), and more particularly to a sensing method and a sensing device for human driven vehicles under a partial VANET environment.

Description of Related Arts

The development trends of the modern automobile industry are networking and automation. Networking means the vehicles communicate with each other and communicate with the road side unit through the communication technology. The vehicles, which are equipped with various sensors (such as camera and laser radar) and communication devices, can utilize the specific communication technology such as DSRC (dedicated short range communication) to realize the information exchange with the other vehicles and the road side unit. These vehicles have the higher and higher occupancy. These CAVs (connected and autonomous vehicles) can execute the high-level driving task, such as dynamic platoon formation. However, in the foreseeable future, the HDVs (human driven vehicles) without any communication device still occupy the major part on the roads. Because the HDVs lack the communication means, it is unable for the system to obtain the information of the HDVs.

However, for some typical applications under the VANET (vehicular ad hoc network) environment, the information of the HDVs is necessary. For example, when the CAVs dynamically form a platoon, the interaction with the HDVs needs to be considered, when the VANET conducts data routing, the data transmission efficiency is influenced by the operation state of the CAV, while the operation state of the CAV is influenced by the HDVs. Thus, how to obtain the information of the HDVs from the operation state of the CAV is important.

SUMMARY OF THE PRESENT INVENTION

Aiming at deficiencies in prior art, an object of the present invention is to provide a sensing method for HDVs (human driven vehicles) under a partial VANET (vehicular ad hoc network) environment. The method adopts information of a CAV (connected and autonomous vehicle) or multiple CAVs as an input, and outputs existence and location information of the HDVs. Therefore, exact locations of the HDVs which are originally invisible to the system can be indirectly inferred.

In order to accomplish the above object, the present invention adopts technical solutions as follows.

A sensing method for HDVs under a partial VANET environment comprises steps of:

constructing an existence sensing module and a location sensing module, wherein, both of the existence sensing module and the location sensing module adopt state information of a CAV (connected and autonomous vehicle) as an input, an output of the existence sensing module is existence of surrounding HDVs of the CAV; and an output of the location sensing module is probability density distributions of distances between the CAV and the surrounding HDVs;

for a scenario that a single CAV exists, adopting a first sensing procedure, specifically comprising steps of: estimating existence of each surrounding HDV of the CAV with the existence sensing module: estimating a location of each surrounding HDV with the location sensing module; continuously conducting the first sensing procedure, so as to output estimation results of the surrounding HDVs of the CAV in real-time;

for a scenario that multiple CAVs exist, adopting a second sensing procedure, specifically comprising steps of: applying the first sensing procedure to each CAV, so as to obtain existence and location information of surrounding HDVs of each CAV, checking whether there is a confliction among the estimation results from the CAVs with confliction criterion, if the confliction exists, fusing conflicted estimation results, and obtaining final existence and location information of each HDV.

In the above technical solutions, the existence sensing module is constructed based on a LSTM RNN (long-short-term-memory recurrent neural network), comprising two layers, wherein:

a first layer is a LSTM layer; an input of the first layer is historical motion information of the CAV, comprising lateral displacement, longitudinal displacement, normalized speed and acceleration, a sequence length of the first layer is set manually; in a practical application, the sequence length is generally 20; because state decision of the CAV needs to consider five vehicles, respectively an ego-lane leader, a left-lane leader, a left-lane follower, a right-lane leader, and a right lane follower of the CAV, an output of the first layer only adopts the last five data, and a second layer is a sigmoid layer, for mapping the output of the first layer to an interval of [0,1]; and an output of the second layer is five scalars, respectively representing existence probabilities of the HDVs in five surrounding directions of the CAV.

The location sensing module is constructed based on the LSTM RNN, comprising three layers, wherein:

a first layer is a LSTM layer; an input of the first layer is the historical motion information of the CAV, comprising the lateral displacement, the longitudinal displacement, the normalized speed and the acceleration; the first layer of the location sensing module is consistent with the first layer of the existence sensing module;

a second layer is a feed forward layer; the second layer adopts an output of the first layer as an input; and an output of the second layer is five classes of variables, respectively corresponding to the five surrounding directions of the CAV; and a third layer is a mixture density layer, which constructs a probability density distribution function of locations of the HDVs based on a GMM (Gaussian mixture model) with utilizing the output of the second layer, and obtains estimates.

The confliction criterion is: if two CAVs simultaneously satisfy following three rules, a confliction exists between estimation results of the two CAVs, wherein:

a first rule is that the two CAVS are separated by at most one lane;

a second rule is that a longitudinal distance between the two CAVs is smaller than a distance threshold; and a third rule is that the two CAVs and surrounding HDVs thereof are probabilistic close; a meaning of probabilistic close is defined as follows:

$$\begin{cases} \int_{min(\hat{x}_{M_{EV1}},\hat{x}_{N_{EV2}})}^{max(\hat{x}_{M_{EV1}},\hat{x}_{N_{EV2}})} p_{M_{EV1}}(\hat{x}_{M_{EV2}} - x)dx \le \bar{\bar{p}} \\ \int_{min(\hat{x}_{M_{EV1}},\hat{x}_{N_{EV2}})}^{max(\hat{x}_{M_{EV1}},\hat{x}_{N_{EV2}})} p_{N_{EV2}}(\hat{x}_{N_{EV2}} - x)dx \le \bar{\bar{p}} \end{cases}$$

wherein: EV1 and EV2 respectively represent the two CAVs; $M_{EV1}$ represents any one of the surrounding HDVs of EV1; $N_{EV2}$ represents any one of the surrounding HDVs of EV2;

$$\hat{x}_{M_{EV1}} \text{ and } \hat{x}_{N_{EV2}}$$

respectively represent location estimates of $M_{EV1}$ and $N_{Ev2}$;

$$p_{M_{EV1}}(x) \text{ and } p_{N_{EV1}}(x)$$

respectively represent probability density distributions of $M_{Ev1}$ and $N_{Ev2}$; and $\bar{\bar{p}}$ is a manually set threshold and is 0.2;

when estimation results of multiple CAVs (suppose the number of CAVs is N) are conflicted, one result with maximum probability is selected from 1+N+1 possible results as a final estimation result, wherein the 1+N+1 possible results are respectively:

(1) maintaining all of the estimation results of the N CAVs (even though the confliction criterion is satisfied, because there is no better solution, the estimation result of each CAV is still maintained);

(2) maintaining an estimation result of one CAV, and discarding estimation results of the other CAVs, totally N possibility; and (3) weighting probability densities in the estimation results of the N CAVs, and obtaining a final probability density and location estimate of each HDV.

The present invention further provides a sensing device for HDVs under a partial VANET environment, comprising a memory, a processor, and a computer program which is stored in the memory and runs on the processor, wherein: the processor executes the computer program, so as to implement the steps of the above sensing method.

The present invention has beneficial effects as follows.

The method provided by the present invention can sense the HDVs in the traffic flow under the partial VANET environment in real-time. With utilizing the information of the CAV as the input, the existence and location information of the surrounding HDVs are obtained, so that the exact locations of the HDVs which are originally invisible to the system can be indirectly inferred. The sensing method provided by the present invention can be deployed inside each CAV, so that the CAV exchanges information with the surrounding CAVs and the information of the surrounding HDVs is obtained. The sensing method can also be deployed inside the road side unit, so that the road side unit exchanges information with the CAVs within the communication range and the historical motion states of the CAVs are obtained. Thus, the existence and exact locations of the surrounding HDVs of each CAV are obtained based on the sensing method provided by the present invention.

BRIEF DESCRIPTION OF THE DRAWINGS

The patent of application file contains at least one drawing executed in color. Copies of this patent or patent application publication with color drawing(s) will be provided by the Office upon request and payment of the necessary fee.

FIG. 9 (b) shows conflictions among three CAVs.

DETAILED DESCRIPTION OF THE PREFERRED EMBODIMENT

The present invention is further illustrated with accompanying drawings. The embodiments described below are only preferred embodiments of the present invention and the present invention is not limited thereto. For one of ordinary skill in the art, variants made without departing from the present invention should be all encompassed in the protection scope of the present invention.

Figure 1A:
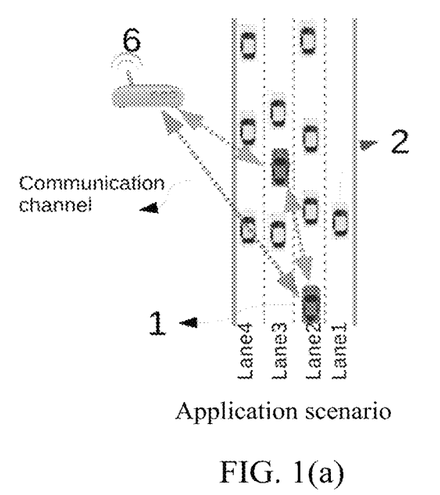
FIG. 1(a) is a sketch view of an application scenario of the present invention.
Figure 1B:
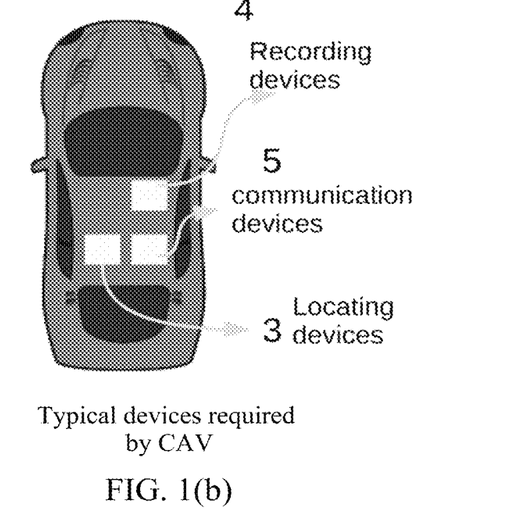
FIG. 1(b) is a sketch view of typical devices required by a CAV (connected and autonomous vehicles).

FIG. 1(a) is a sketch view of an application scenario of the present invention, and FIG. 1(b) is a sketch view of typical devices required by a CAV (connected and autonomous vehicles). In FIG. 1(a), a road segment with multiple lanes is shown. In a traffic flow, there are two types of vehicles. The first type of vehicles is the CAV 1, which is equipped with three required types of devices. The first type of devices is locating devices 3; a common locating device is a GPS (global position system); with utilizing the locating devices, the coordinate of the CAV at any moment can be obtained. The second type of devices is communication devices 5; with utilizing the communication devices, the CAV can communicate with other vehicles or a road side unit 6 (shown in FIG. 1(a)). The third type of devices is recording devices 4, for storing historical information of the CAV, comprising lateral displacement, longitudinal displacement, speed and acceleration. Moreover, the second type of vehicles in the traffic flow is the HDV (human driven vehicle) 2, which is not equipped with the communication devices and cannot exchange information with the outside world. Therefore, it is unable to obtain the information of the HDV, such as location and existence.

A purpose of the present invention is to estimate and obtain the existence and exact locations of the HDVs, if they exist. The sensing method can be deployed in two ways. The first way is to deploy the sensing method inside each CAV, so that the CAVs can exchange the historical motion state information and cooperatively accomplish the task of sensing the HDVs. The second way is to deploy the sensing method inside the road side unit 6 shown in FIG. 1(a). The road side unit collects the historical information of all the CAVS within the communication range and senses the surrounding HDVs of these CAVs.

Figure 2A:
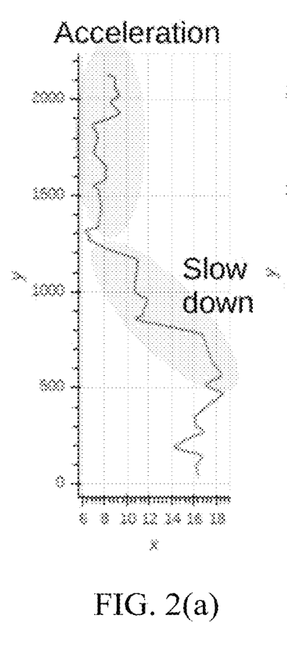
FIG. 2(a) shows a motion trajectory of an EV (ego vehicle).
Figure 2B:
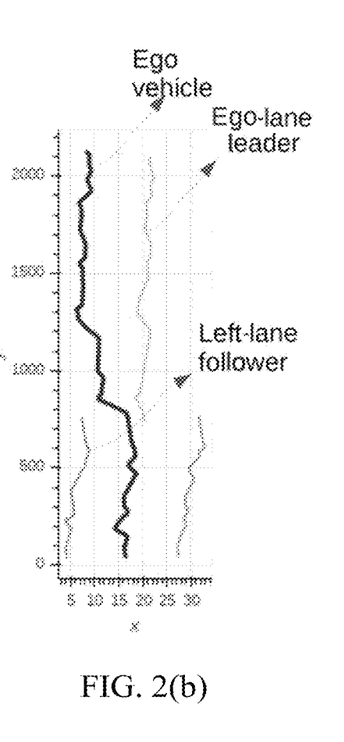
FIG. 2(b) shows motion trajectories of an ego-lane leader, a left-lane follower and a right-lane follower of the EV.
Figure 2C:
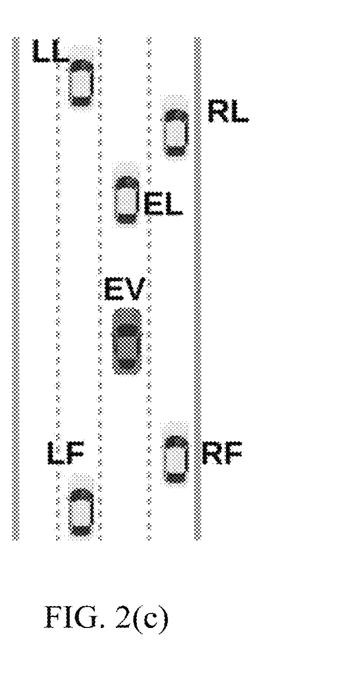
FIG. 2(c) is a sketch view of the EV and five surrounding HDVs (human driven vehicles).

FIG. 2(a) shows a motion trajectory of one CAV, namely EV (ego vehicle). The color of the trajectory indicates the instantaneous speed. The warmer color indicates the lower speed, while the cooler color indicates the higher speed. The x-axis represents the lateral distance, while the y-axis represents the longitudinal distance. It can be concluded from the motion trajectory and the speed that: the CAV firstly slows down, then changes the lane, and accelerates thereafter. It can be conjectured that: the reasons why the CAV changes the lane are the ego-lane leader has the lower speed and the left lane provides the enough large space. Thus, it can be inferred that: the ego-lane leader is closer; the left-lane leader is farther; and the left-lane follower is also farther. FIG. 2(b) shows motion trajectories of the ego-lane leader, the left-lane follower and the right-lane follower of the CAV, which proves the above inference. It is intuitive from FIG. 2(a) and FIG. 2(b) that the trajectory-related information can be used to estimate the existence and exact locations of the surrounding vehicles of the CAV. Generally, the state decision of the CAV needs to consider five surrounding vehicles, as shown in FIG. 2(c). In FIG. 2(c), EV represents the ego vehicle; EL represents the ego-lane leader; LL represents the left-lane leader; LF represents the left-lane follower; RL represents the right-lane leader; and RF represents the right-lane follower. The present invention utilizes the information of the CAV to estimate the existence and locations of the HDVs in five surrounding directions of the CAV.

Figure 3A:
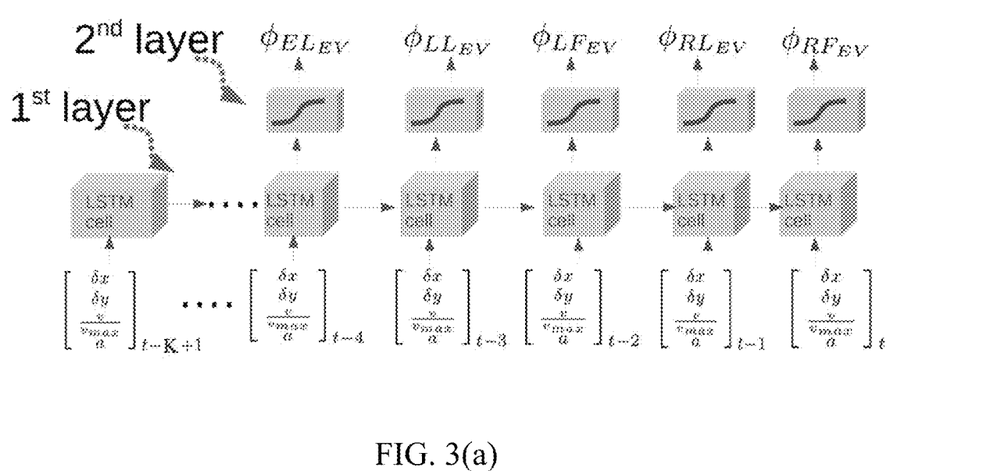
FIG. 3(a) is a structural sketch view of an existence sensing module according to the present invention.
Figure 3B:
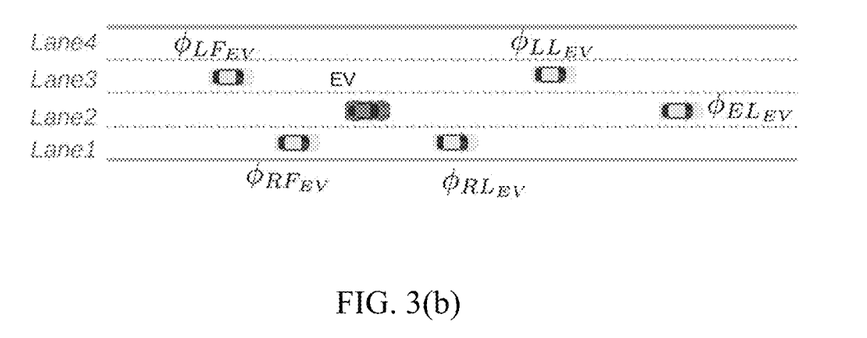
FIG. 3(b) is a sketch view of an estimation result of the existence sensing module.

According to the sensing method of the present invention, the existence sensing module and the location sensing module are firstly constructed. The existence sensing module is constructed based on a LSTM RNN (long-short-term-memory recurrent neural network), as shown in FIG. 3(a), comprising two layers, wherein:

a first layer is a LSTM layer; an input of the first layer is a sequence with a length of K; an input of a first LSTM cell is:

$$\begin{bmatrix} \delta x \\ \delta y \\ \dfrac{v}{v_{max}} \\ \alpha \end{bmatrix}_{t-K+1}$$

wherein: the input is a vector with a length of 4; the subscript t−K+1 represents a moment; t represents a current moment; δx and δy respectively represent the lateral displacement and the longitudinal displacement of the $$CAV; \dfrac{v}{v_{max}}$$

represents the normalized speed; v represents the real-time speed of the CAV; $v_{max}$ represents the road speed limit; and a represents the acceleration;

a second layer is a sigmoid layer, for mapping the output of the first layer to an interval of [0,1]; an output of the second layer is five scalars, respectively $$\phi_{EL_{EV}}, \phi_{LL_{EV}}, \phi_{LF_{EV}}, \phi_{RL_{EV}}, \text{ and } \phi_{RF_{EV}}$$

shown in FIG. 3(b), representing the existence probabilities of the HDVs in the five surrounding directions of the CAV; the subscript EV represents the ego vehicle; the subscript EL represents the ego-lane leader of the EV; the subscript LL represents the left-lane leader of the EV; the subscript LF represents the left-lane follower of the EV; the subscript RL represents the right-lane leader of the EV; the subscript RF represents the right-lane follower of the EV; if the scalar is larger than 0.5, the HDV in the corresponding direction exists; conversely, the HDV does not exist.

Figure 4:
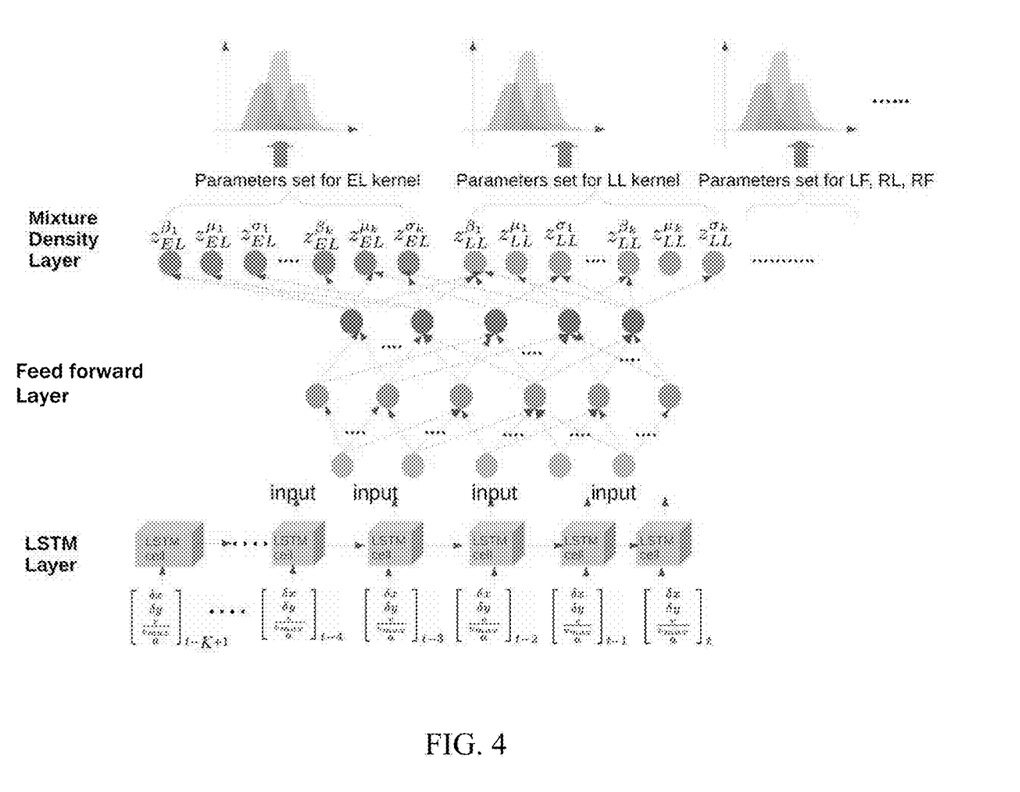
FIG. 4 is a structural sketch view of a location sensing module according to the present invention.
Figure 5:
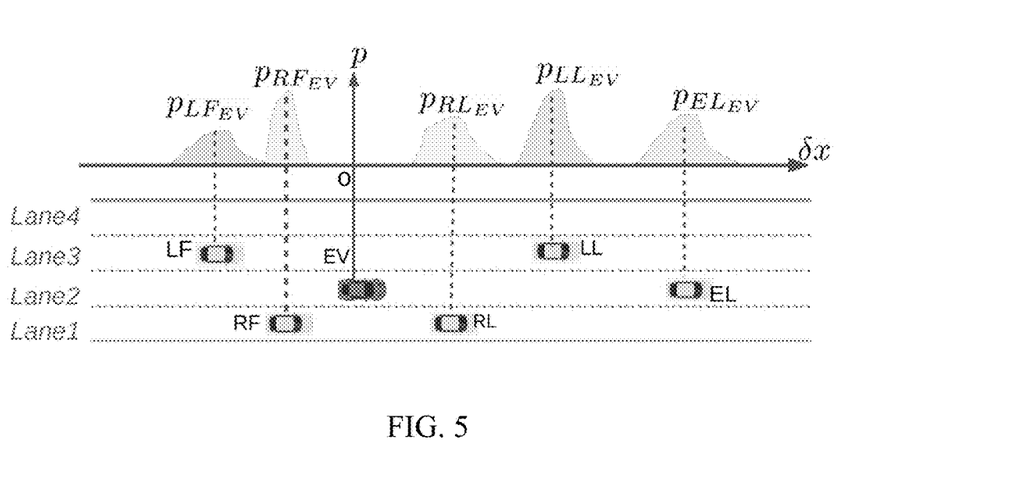
FIG. 5 is a sketch view of an estimation result of the location sensing module.

The location sensing module is constructed based on the LSTM RNN, as shown in FIG. 4, comprising three layers; wherein:

a first layer is for processing a sequence input; a second layer is for calculating parameters of Gaussian mixture density; and a third layer is for calculating a final value of the Gaussian mixture density;

the first layer is a common LSTM layer, which is same as the first layer of the existence sensing module;

the second layer is a common feed forward layer; an output of the second layer is five classes of variables, respectively corresponding to the five surrounding directions of the CAV, expressed as:

$$\begin{cases} EL: z_{EL_{EV}}^{\beta_1}, z_{EL_{EV}}^{\beta_2}, \ldots z_{EL_{EV}}^{\beta_k} z_{EL_{EV}}^{\mu_1}, z_{EL_{EV}}^{\mu_2}, \ldots z_{EL_{EV}}^{\mu_k} \text{ and} & (a) \\ \quad z_{EL_{EV}}^{\sigma_1}, z_{EL_{EV}}^{\sigma_2}, \ldots z_{EL_{EV}}^{\sigma_k} \\ LL: z_{LL_{EV}}^{\beta_1}, z_{LL_{EV}}^{\beta_2}, \ldots z_{LL_{EV}}^{\beta_k} z_{LL_{EV}}^{\mu_1}, z_{LL_{EV}}^{\mu_2}, \ldots z_{LL_{EV}}^{\mu_k} \text{ and} & (b) \\ \quad z_{LL_{EV}}^{\sigma_1}, z_{LL_{EV}}^{\sigma_2}, \ldots z_{LL_{EV}}^{\sigma_k} \\ LF: z_{LF_{EV}}^{\beta_1}, z_{LF_{EV}}^{\beta_2}, \ldots z_{LF_{EV}}^{\beta_k} z_{LF_{EV}}^{\mu_1}, z_{LF_{EV}}^{\mu_2}, \ldots z_{LF_{EV}}^{\mu_k} \text{ and} & (c) \\ \quad z_{LF_{EV}}^{\sigma_1}, z_{LF_{EV}}^{\sigma_2}, \ldots z_{LF_{EV}}^{\sigma_k} \\ RL: z_{RL_{EV}}^{\beta_1}, z_{RL_{EV}}^{\beta_2}, \ldots z_{RL_{EV}}^{\beta_k} z_{RL_{EV}}^{\mu_1}, z_{RL_{EV}}^{\mu_2}, \ldots z_{RL_{EV}}^{\mu_k} \text{ and} & (d) \\ \quad z_{RL_{EV}}^{\sigma_1}, z_{RL_{EV}}^{\sigma_2}, \ldots z_{RL_{EV}}^{\sigma_k} \\ RF: z_{RF_{EV}}^{\beta_1}, z_{RF_{EV}}^{\beta_2}, \ldots z_{RF_{EV}}^{\beta_k} z_{RF_{EV}}^{\mu_1}, z_{RF_{EV}}^{\mu_2}, \ldots z_{RF_{EV}}^{\mu_k} \text{ and} & (e) \\ \quad z_{RF_{EV}}^{\sigma_1}, z_{RF_{EV}}^{\sigma_2}, \ldots z_{RF_{EV}}^{\sigma_k} \end{cases} \quad (1)$$

if the Gaussian mixture distribution has k mixtures (see equation (2)), the number of the outputted variables of the second layer in the equation (1) is k*3*5; "3" represents weight, mean value and standard deviation; "5" represents the five surrounding directions of the CAV; namely five classes; in each class of variables, the superscripts β, μ and σ is respectively represent the weight, mean value and standard deviation of the Gaussian mixture density;

the third layer is a mixture density layer, which constructs a probability density distribution function of locations of the HDVs based on a GMM (Gaussian mixture model) with utilizing the output of the second layer (the output of the third layer is five probability density functions, as shown in FIG. 5); M is assumed as the HDV in one surrounding direction of the EV, and the probability density of the location of M is expressed as:

$$p_{M_{EV}}(x) = \sum_{j=1}^{k} \beta_{M_{EV},j} N(x; \mu_{M_{EV},j} \sigma_{M_{EV},j}) \quad (2)$$

$$M \in \{EL, LL, LF, RL, RF\}$$

wherein: k is the number of mixtures in the GMM;

$$N(x; \mu_{M_{EV},j}, \sigma_{M_{EV},j})$$

represents a Gaussian distribution with the mean value of $\mu_{M_{EV},j}$ and the variance of $$\sigma_{M_{EV},j}; \beta_{M_{EV},j}$$

represents the weight of a $j^{th}$ Gaussian distribution, $$\mu_{M_{EV},j}$$

represents the mean value of the $j^{th}$ Gaussian distribution, and $$\sigma_{M_{EV},j}$$

represents the variance of the $j^{th}$ Gaussian distribution, which are obtained through calculating the output of the second layer, expressed as:

$$\begin{cases} \beta_{M_{EV},j} = \dfrac{e^{\beta_j}_M}{\sum_i e^{\beta_i}_M}, \forall j = 1, 2, \ldots k, \\ \sigma_{M_{EV},j} = e^{\sigma_j}_M, \forall j = 1, 2 \ldots k, \\ \mu_{M_{EV},j} = z^{\mu_j}_M, \forall j = 1, 2 \ldots k, \end{cases} \quad (3)$$

at the moment, the location estimate $\hat{x}M_{EV}$ of the vehicle M is:

$$\hat{x}_{M_{EV}} = \quad (4)$$

$$E(p_{M_{EV}}(x)) = E\left(\sum_{j=1}^{k} \beta_{M_{EV},j} N(x; \mu_{M_{EV},j}, \sigma_{M_{EV},j})\right) = \sum_{j=1}^{k} \beta_{M_{EV},j} \mu_{M_{EV},j}.$$

Figure 6:
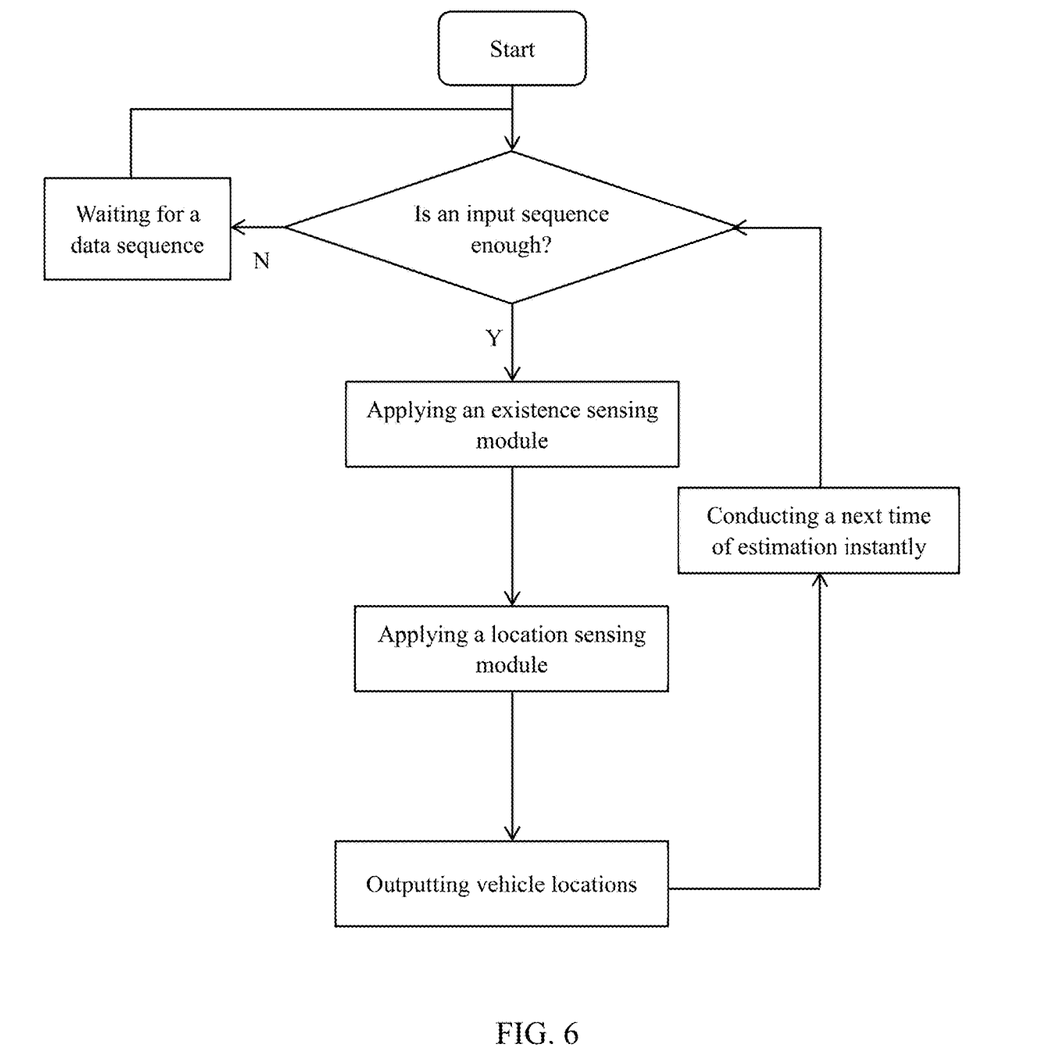
FIG. 6 is a flow chart of a first sensing procedure (P1) when a single CAV exists.

FIG. 6 is a flow chart of a first sensing procedure (named as P1) when a single CAV exists. The procedure P1 firstly collects the historical motion information of the CAV, then sequentially employs the existence sensing module and the location sensing module, and obtains the existence and location estimates of the surrounding HDVs of the CAV.

Figure 7:
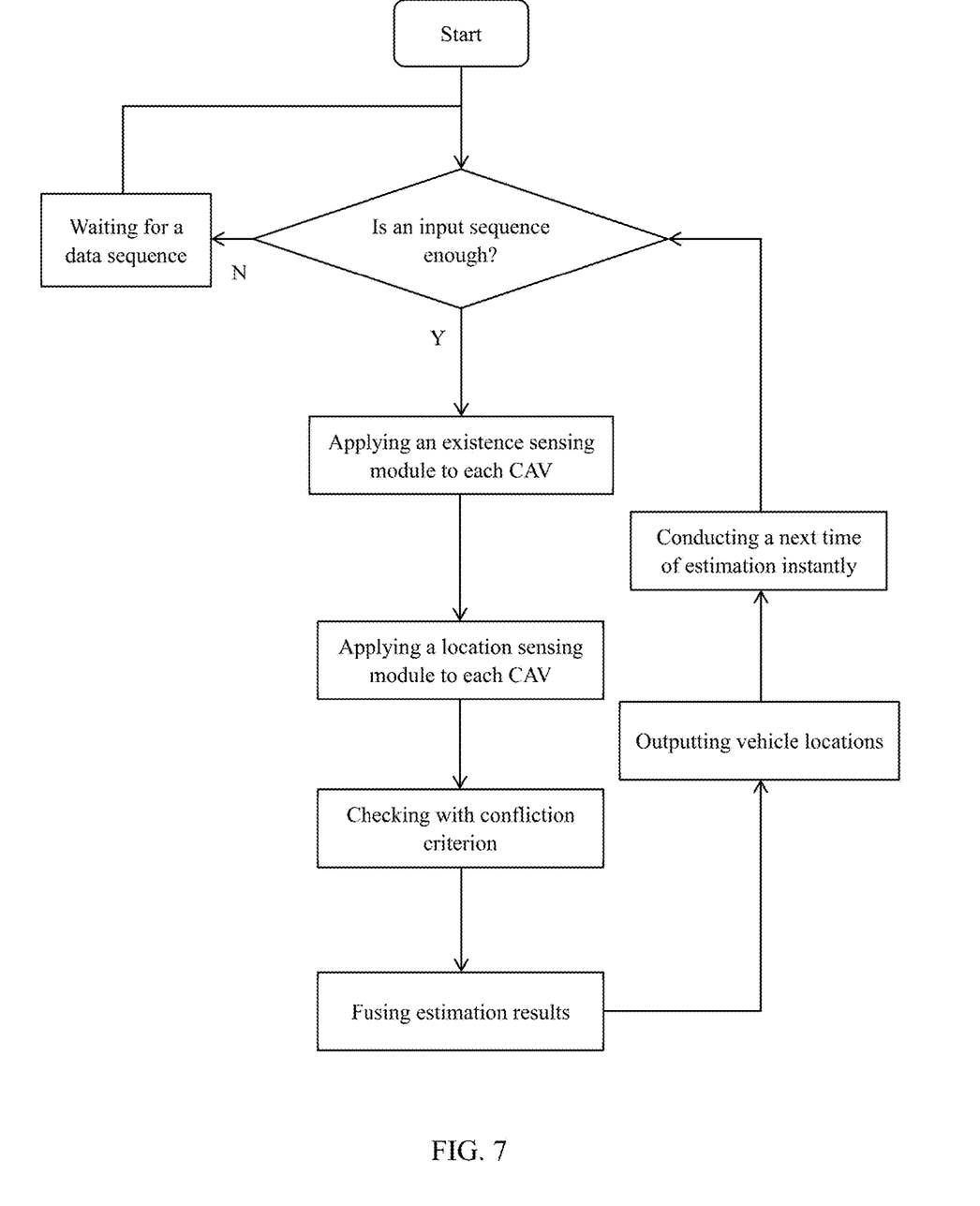
FIG. 7 is a flow chart of a second sensing procedure (P2+) when multiple CAVs exist.

FIG. 7 is a flow chart of a second sensing procedure (named as P2+) when multiple CAVs exist. When multiple CAVs exist, the first sensing procedure shown in FIG. 6 is applied to each CAV, so as to sense the surrounding HDVs of each CAV; thereafter, whether a confliction exists among the estimation results of the CAVs is checked.

Figure 8:
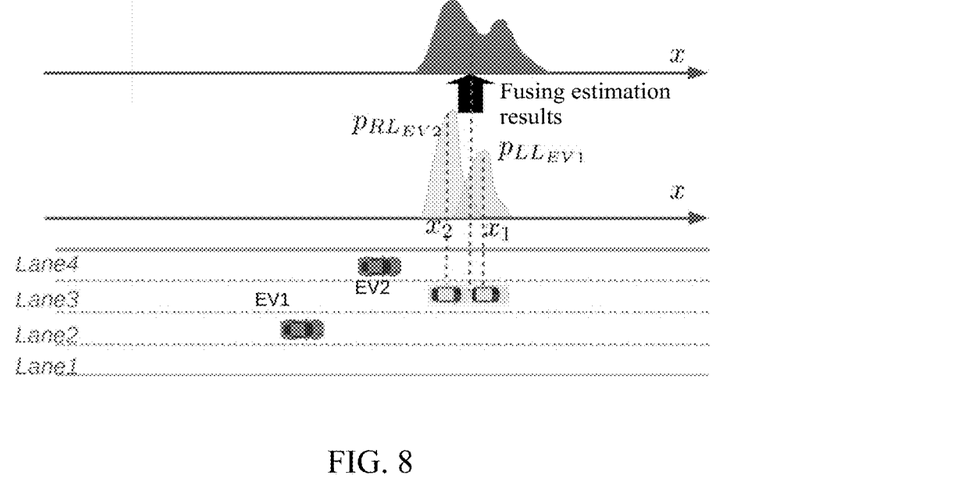
FIG. 8 shows a meaning of a confliction between two CAVs.
Figure 9A:
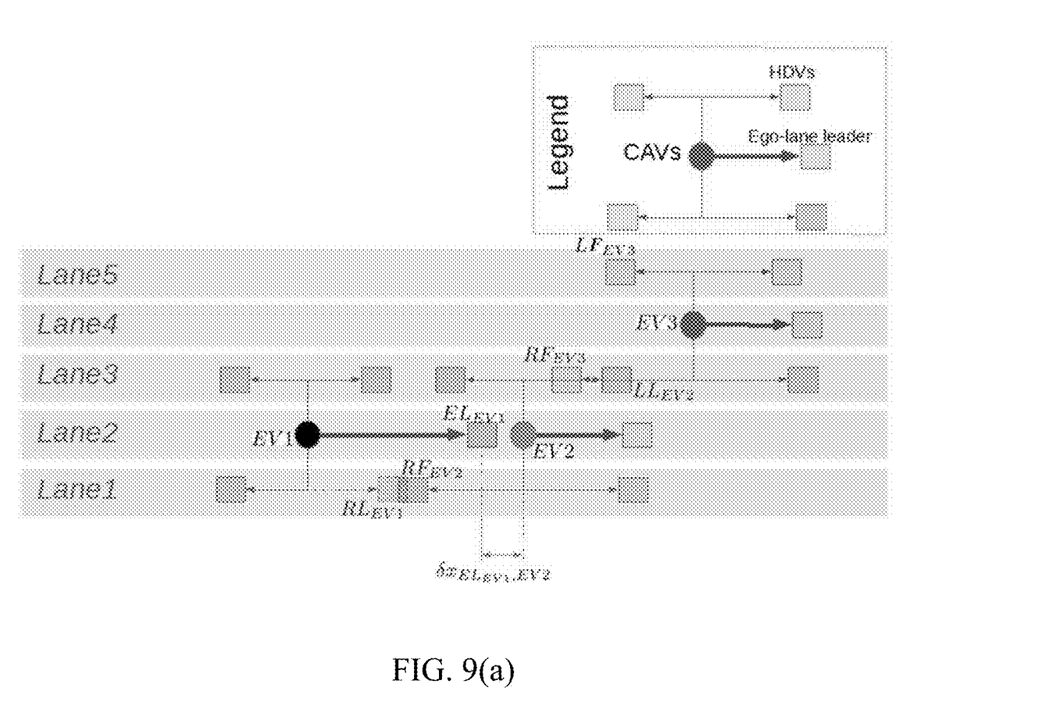
FIG. 9(a) shows conflictions between two CAVs.
Figure 9B:
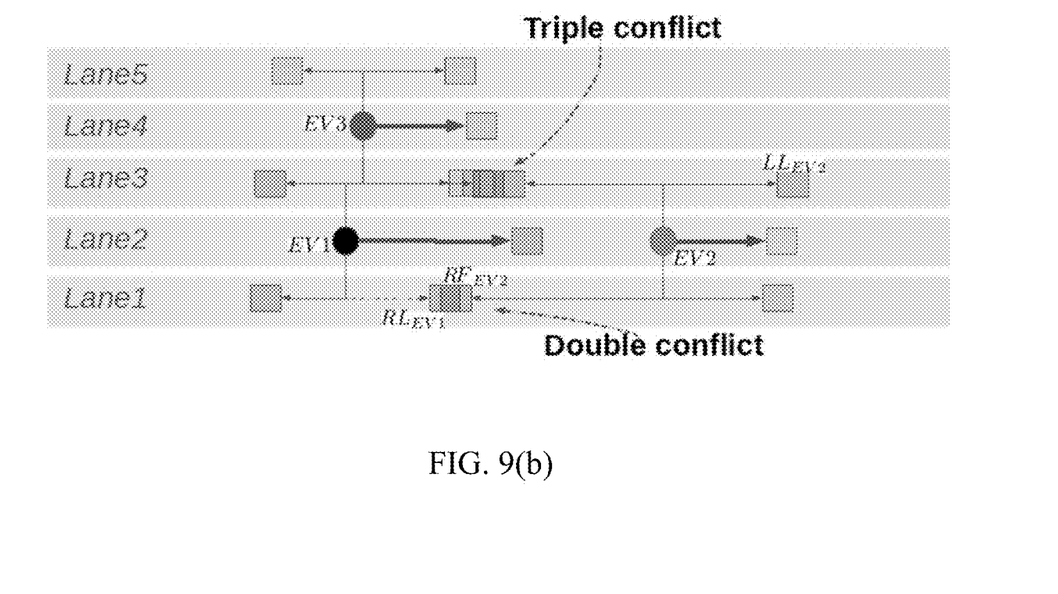

FIG. 8 shows a meaning of the confliction. In FIG. 8, there are two CAVs, respectively EV1 and EV2; an estimation result of EV1 to the left-lane leader $LL_{EV1}$ is $x_1$; an estimation result of EV2 to the right-lane leader $RL_{EV2}$ is $x_2$; the two estimation results are close, and a part of the estimation results are overlapped, so that the coexistence of $LL_{EV1}$ and $RL_{EV2}$ is impossible. A more realistic result is to fuse the two distribution functions $P_{LL_{EV1}}(x)$ and $P_{RL_{EV2}}(x)$. The method provided by the present invention is not only applicable to the confliction between the estimation results of the two CAVs. FIG. 9(a) shows conflictions between two CVAs, and FIG. 9(b) shows conflictions among three CAVs. In FIG. 9(a), $RL_{EV1}$ conflicts with $RF_{EV2}$; and $EL_{EV1}$ conflicts with EV2. In FIG. 9(b), the estimation results of three CAVs are conflicted, namely locations of $LL_{EV1}$, $LF_{EV2}$, and $RL_{Ev3}$ are conflicted. For convenient description, Neighboring(EV) is used to represent the set containing the five surrounding vehicles of EV; ExNeighboring(EV) is used to represent the set containing the EV and the five surrounding vehicles thereof; that is to say, ExNeighboring(EV)={EV} UNeighboring(EV).

Figure 10:
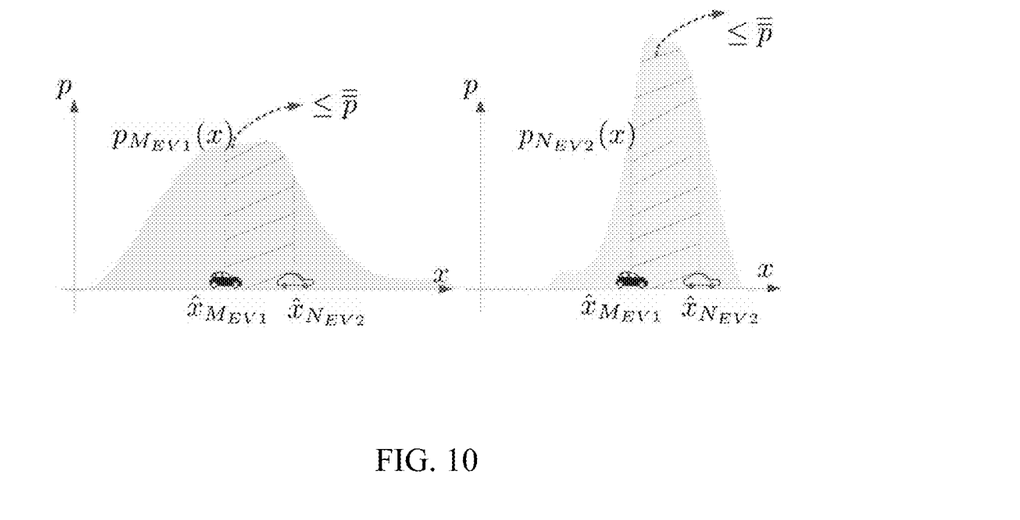
FIG. 10 shows a meaning of probabilistic close.

The confliction criterion is used to check whether there is a confliction. If the two CAVs, EV1 and EV2, simultaneously satisfy following three rules, it is considered that a confliction exists between the estimation results of the two CAVs, wherein:

a first rule is that the two CAVS are separated by at most one lane; when there are two lanes between EV1 and EV2, it is impossible that the estimation results of the two CAVs are conflicted;

a second rule is that a longitudinal distance between the two CAVs is smaller than a distance threshold, namely $\Delta x_{EV1,EV2}(t) = |x_{EV1} - x_{EV2}| < \bar{x}$; wherein: $\bar{x}$ is a preset distance threshold; because a distance threshold that the leader will influence the follower is generally 120 meters, $\bar{x}$ can be set as 240 meters; when the second rule is satisfied, ExNeighboring(EV1) may conflict with ExNeighboring(EV2); and a third rule is that one vehicle in ExNeighboring(EV1) and one vehicle in ExNeighboring(EV2) are probabilistic close; wherein: ExNeighboring(EV) represents the set containing the EV and the HDVs in the five surrounding directions; $M_{EV1}$ is assumed as one surrounding HDV of EV1; $N_{EV2}$ is assumed as one surrounding HDV of EV2;

$$\hat{x}_{M_{EV_1}} \text{ and } \hat{x}_{N_{EV_2}}$$

respectively represent location estimates of $M_{EV1}$ and $N_{EV2}$; a meaning of probabilistic close is defined as follows:

$$\begin{cases} \int_{\min(\hat{x}_{M_{EV_1}}, \hat{x}_{N_{EV_2}})}^{\max(\hat{x}_{M_{EV_1}}, \hat{x}_{N_{EV_2}})} p_{M_{EV_1}}(\hat{x}_{M_{EV_1}} - x) dx \leq \bar{p} \\ \int_{\min(\hat{x}_{M_{EV_1}}, \hat{x}_{N_{EV_2}})}^{\max(\hat{x}_{M_{EV_1}}, \hat{x}_{N_{EV_2}})} p_{N_{EV_2}}(\hat{x}_{N_{EV_2}} - x) dx \leq \bar{p} \end{cases} \quad (5)$$

wherein: $\bar{p}$ is a manually set threshold and is 0.2; as shown in FIG. 10, when satisfying the above equation (5), the possibility that the estimation results of $M_{EV1}$ and $N_{EV2}$ are overlapped is high.

Figure 11:
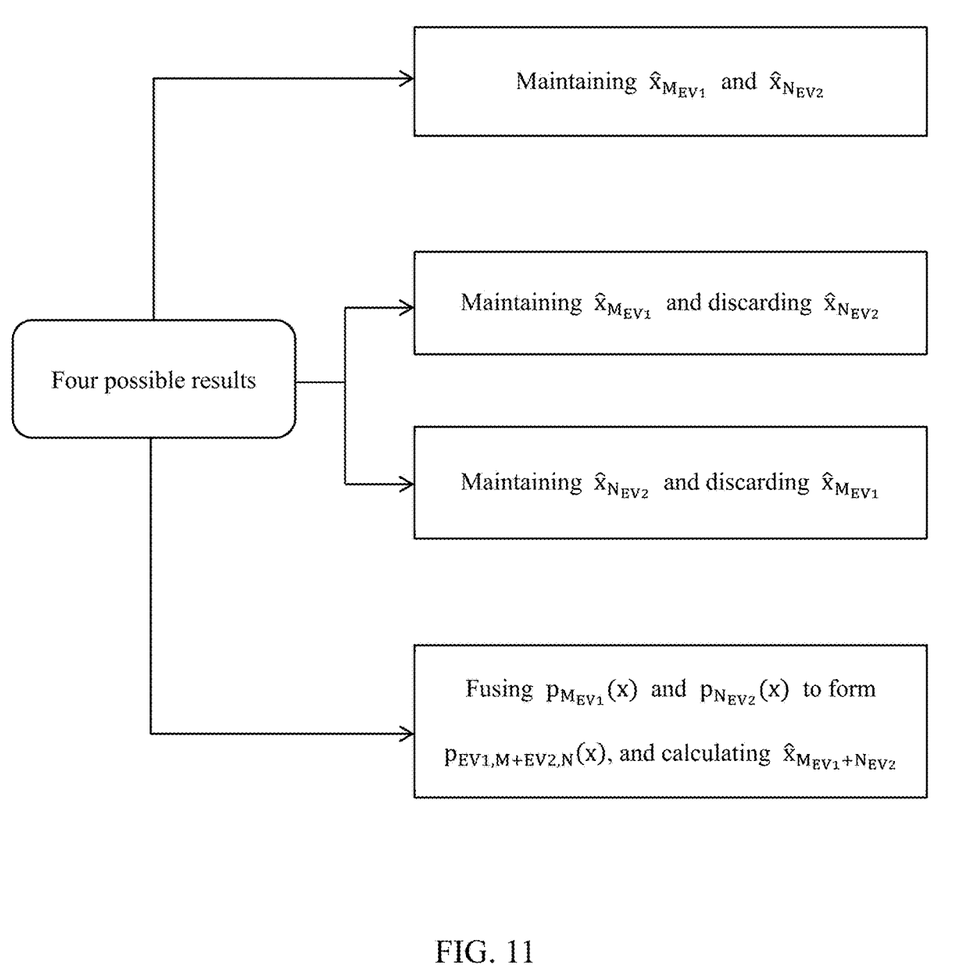
FIG. 11 shows four possible results when estimation results of two CAVs are conflicted.

FIG. 11 shows four possible results when the estimation results of the two CAVs are conflicted, wherein:

a first possible result is to maintain $$\hat{x}_{M_{EV_1}} \text{ and } \hat{x}_{N_{EV_2}},$$

and a corresponding probability is $$p_{M_{EV_1}}(\hat{x}_{M_{EV_1}}) * p_{N_{EV_2}}(\hat{x}_{N_{EV_2}});$$

a second possible result is to maintain $$\hat{x}_{M_{EV_1}}$$

and discard $$\hat{x}_{N_{EV_2}},$$

and a corresponding probability is $$p_{M_{EV_1}}(\hat{x}_{M_{EV_1}}) * p_{M_{EV_1}}(\hat{x}_{N_{EV_2}});$$

a third possible result is to maintain $$\hat{x}_{N_{EV_2}}$$

and discard $$\hat{x}_{M_{EV_1}},$$

and a corresponding probability is $$p_{N_{EV_2}}(\hat{x}_{M_{EV_1}}) * p_{N_{EV_2}}(\hat{x}_{N_{EV_2}});$$

a fourth possible result is to fuse $$p_{M_{EV_1}}(x) \text{ and } P_{N_{EV_2}}(x),$$

so as to form a new location probability density $P_{EV1,M+EV2,N}(x)$, and obtain a final location estimate $$\hat{x}_{M_{EV_1}+N_{EV_2}}$$

of the vehicle; wherein:

$$p_{M_{EV1}+N_{EV2}}(x) = \qquad (6)$$
$$\frac{\phi_{M_{EV2}}}{\phi_{M_{EV1}}+\phi_{N_{EV2}}}p_{M_{EV1}}(x) + \frac{\phi_{N_{EV2}}}{\phi_{M_{EV1}}+\phi_{N_{EV2}}}p_{N_{EV2}}(x)$$

$$\phi_{M_{EV1}} \text{ and } \phi_{N_{EV2}}$$

are output results of the existence sensing module;

$$\hat{x}_{M_{EV1}+N_{EV2}} = \frac{\phi_{M_{EV1}}\hat{x}_{M_{EV1}} + \phi_{N_{EV2}}\hat{x}_{N_{EV2}}}{\phi_{M_{EV2}}+\phi_{N_{EV2}}} \qquad (7)$$

a corresponding probability of the fourth possible result is $$p_{M_{EV1}+N_{EV2}}(\hat{x}_{N_{EV2}}) * p_{M_{EV1}+N_{EV2}}(\hat{x}_{M_{EV1}}).$$

Among the four possible results, one result with maximum probability is selected as a final estimation result, and a final output is shown in FIG. 11.

Similarly, when the estimation results of the N CAVs are conflicted, one result with the maximum probability is selected from 1+N+1 possible results as the final estimation result, wherein the 1+N+1 possible results are respectively:

(1) maintaining all of the estimation results of the N CAVs;

(2) maintaining the estimation result of one CAV, and discarding the estimation results of the other CAVs, totally N possibility; and (3) weighting the probability densities in the estimation results of the N CAVs, and obtaining the final probability density and location estimate of each HDV.

What is claimed is:

1. A sensing method for HDVs (human driven vehicles) under a partial VANET (vehicular ad hoc network) environment comprises steps of:

constructing an existence sensing module and a location sensing module, wherein: both of the existence sensing module and the location sensing module adopt state information of a CAV (connected and autonomous vehicle) as an input an output of the existence sensing module is existence of surrounding HDVs of the CAV; and an output of the location sensing module is probability density distributions of distances between the CAV and the surrounding HDVs;

for a scenario that a single CAV exists, adopting a first sensing procedure, specifically comprising steps of: estimating existence of each surrounding HDV of the CAV with the existence sensing module; estimating a location of each surrounding HDV with the location sensing module; continuously conducting the first sensing procedure, so as to output estimation results of the surrounding HDVs of the CAV in real-time;

for a scenario that multiple CAVs exist, adopting a second sensing procedure, specifically comprising steps of: applying the first sensing procedure to each CAV, so as to obtain existence and location information of surrounding HDVs of each CAV;

checking whether there is a confliction among the estimation results from the CAVs with confliction criterion; if the confliction exists, fusing conflicted estimation results, and obtaining final existence and location information of each HDV, wherein: the existence sensing module is constructed based on a LSTM RNN (long-short-term-memory recurrent neural network), comprising two layers, wherein:

a first layer is a LSTM layer; an input of the first layer is historical motion information of the CAV, comprising lateral displacement, longitudinal displacement, normalized speed and acceleration; a sequence length of the first layer is set manually;

because state decision of the CAV needs to consider five vehicles, respectively an ego-lane leader, a left-lane leader, a left-lane follower, a right-lane leader, and a right lane follower of the CAV, an output of the first layer only adopts the last five data; and a second layer is a sigmoid layer, for mapping the output of the first layer to an interval of [0,1]; and an output of the second layer is five scalars, respectively representing existence probabilities of the HDVs in five surrounding directions of the CAV.

2. A sensing method for HDVs (human driven vehicles) under a partial VANET (vehicular ad hoc network) environment comprises steps of:

constructing an existence sensing module and a location sensing module, wherein: both of the existence sensing module and the location sensing module adopt state information of a CAV (connected and autonomous vehicle) as an input an output of the existence sensing module is existence of surrounding HDVs of the CAV; and an output of the location sensing module is probability density distributions of distances between the CAV and the surrounding HDVs;

for a scenario that a single CAV exists, adopting a first sensing procedure, specifically comprising steps of: estimating existence of each surrounding HDV of the CAV with the existence sensing module; estimating a location of each surrounding HDV with the location sensing module; continuously conducting the first sensing procedure, so as to output estimation results of the surrounding HDVs of the CAV in real-time;

for a scenario that multiple CAVs exist, adopting a second sensing procedure, specifically comprising steps of: applying the first sensing procedure to each CAV, so as to obtain existence and location information of surrounding HDVs of each CAV; checking whether there is a confliction among the estimation results from the CAVs with confliction criterion; if the confliction exists, fusing conflicted estimation results, and obtaining final existence and location information of each HDV, wherein: the location sensing module is constructed based on a LSTM RNN (long-short-term-memory recurrent neural network), comprising three layers, wherein:

a first layer is a LSTM layer; an input of the first layer is historical motion information of the CAV, comprising lateral displacement, longitudinal displacement, normalized speed and acceleration;

a second layer is a feed forward layer; the second layer adopts an output of the first layer as an input; and an output of the second layer is five classes of variables, respectively corresponding to five surrounding directions of the CAV; and a third layer is a mixture density layer, which constructs a probability density distribution function of locations of the HDVs based on a GMM (Gaussian mixture model) with utilizing the output of the second layer, and obtains estimates.

3. A sensing method for HDVs (human driven vehicles) under a partial VANET (vehicular ad hoc network) environment comprises steps of:

constructing an existence sensing module and a location sensing module, wherein: both of the existence sensing module and the location sensing module adopt state information of a CAV (connected and autonomous vehicle) as an input an output of the existence sensing module is existence of surrounding HDVs of the CAV; and an output of the location sensing module is probability density distributions of distances between the CAV and the surrounding HDVs;

for a scenario that a single CAV exists, adopting a first sensing procedure, specifically comprising steps of: estimating existence of each surrounding HDV of the CAV with the existence sensing module; estimating a location of each surrounding HDV with the location sensing module; continuously conducting the first sensing procedure, so as to output estimation results of the surrounding HDVs of the CAV in real-time;

for a scenario that multiple CAVs exist, adopting a second sensing procedure, specifically comprising steps of: applying the first sensing procedure to each CAV, so as to obtain existence and location information of surrounding HDVs of each CAV; checking whether there is a confliction among the estimation results from the CAVs with confliction criterion; if the confliction exists, fusing conflicted estimation results, and obtaining final existence and location information of each HDV, wherein the confliction criterion is: if two CAVs simultaneously satisfy following three rules, a confliction exists between estimation results of the two CAVs, wherein:

a first rule is that the two CAVS are separated by at most one lane;

a second rule is that a longitudinal distance between the two CAVs is smaller than a distance threshold; and a third rule is that the two CAVs and surrounding HDVs thereof are probabilistic close; a meaning of probabilistic close is defined as follows:

$$\begin{cases} \int_{min(\hat{x}_{M_{EV1}}, \hat{x}_{N_{EV2}})}^{max(\hat{x}_{M_{EV1}}, \hat{x}_{N_{EV2}})} p_{M_{EV1}}(\hat{x}_{M_{EV1}} - x)dx \leq \bar{\bar{p}} \\ \int_{min(\hat{x}_{M_{EV1}}, \hat{x}_{N_{EV2}})}^{max(\hat{x}_{M_{EV1}}, \hat{x}_{N_{EV2}})} p_{N_{EV2}}(\hat{x}_{N_{EV2}} - x)dx \leq \bar{\bar{p}} \end{cases}$$

wherein: EV1 and EV2 respectively represent the two CAVs; $M_{EV1}$ represents any one of surrounding HDVs of EV1; $N_{EV2}$ represents any one of surrounding HDVs of EV2;

$\hat{x}_{M_{EV1}}$ and $\hat{x}_{N_{EV2}}$ respectively represent location estimates of $M_{EV1}$ and $N_{EV2}$;

$p_{M_{EV1}}(x)$ and $p_{N_{EV1}}(x)$ respectively represent probability density distributions of $M_{EV1}$ and $N_{EV2}$; and $\bar{p}$ is a set threshold.

4. The sensing method, as recited in claim 3, wherein: when estimation results of N CAVs are conflicted, one result with maximum probability is selected from 1+N+1 possible results as a final estimation result; the 1+N+1 possible results are respectively:
   (1) maintaining all of the estimation results of the N CAVs;
   (2) maintaining an estimation result of one CAV, and discarding estimation results of the other CAVs, totally N possibility; and
   (3) weighting probability densities in the estimation results of the N CAVs, and obtaining a final probability density and location estimate of each HDV.

* * * * *